(12) United States Patent
Asai et al.

(10) Patent No.: US 6,285,113 B1
(45) Date of Patent: Sep. 4, 2001

(54) SURFACE ACOUSTIC WAVE ACTUATOR, AND MAGNETIC DISK DEVICE AND OPTICAL DISK DEVICE USING THE SAME

(75) Inventors: Katsuhiko Asai; Shinichiro Aoki, both of Kanagawa; Junji Ikeda, Nara; Toshiro Higuchi; Minoru Kurosawa, both of Kanagawa, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/620,050

(22) Filed: Jul. 20, 2000

(30) Foreign Application Priority Data

Jul. 26, 1999 (JP) .................................. 11-210456

(51) Int. Cl.$^7$ ........................................ H02N 2/00
(52) U.S. Cl. .......................................... 310/313 R
(58) Field of Search ...................... 310/313 R, 313 B, 310/313 D

(56) References Cited

U.S. PATENT DOCUMENTS 5,006,749 * 4/1991 White ............................. 310/313 R

FOREIGN PATENT DOCUMENTS

| 08154386-A | * 11/1994 | (JP) | H02N/2/00 |
| 08-154386 | 6/1996 | (JP) | |
| 10296186-A | * 4/1997 | (JP) | H02N/2/00 |
| 11146665-A | * 11/1997 | (JP) | H02N/2/00 |
| 10273261-A | * 9/1998 | (JP) | H02N/2/00 |
| 10296186 A | 11/1998 | (JP) | |
| 11-146665 | 5/1999 | (JP) | |
| 2000-102270 | 4/2000 | (JP) | |
| 2000-102271 | 4/2000 | (JP) | |

OTHER PUBLICATIONS

Keiichiro Tojo et al., "Circulated Energy Surface Acoustic Wave Motor", pp. 505–508, 10$^{th}$ symposium on Electromagnetics and Dynamics (10$^{th}$ SEAD) [No. 98–251] Jun. 23–25, 1998.

\* cited by examiner

Primary Examiner—Elvin Enad
Assistant Examiner—Karen Addison
(74) Attorney, Agent, or Firm—Ratner & Prestia

(57) ABSTRACT

A surface acoustic wave actuator is disclosed which includes unidirectional interdigital transducers disposed on both sides of a vibrator and an electrical combiner. One of the unidirectional interdigital transducers and external power supply are connected to an input port, and the other unidirectional interdigital transducer is connected to an output port of the electrical combiner. The electrical combiner combines input energy from an external power supply and surface acoustic wave energy is electrically converted by one of the unidirectional interdigital transducers, and input to the other unidirectional interdigital transducer. Surface acoustic waves excited by the other unidirectional interdigital transducer propagates on a vibrator, and is input to the other unidirectional interdigital transducer again after passing one unidirectional interdigital transducer and the electrical combiner. A relative movement member is pressed against the vibrator for generating driving force via a friction force so that the relative movement member implements relative movement to the vibrator.

23 Claims, 5 Drawing Sheets

SURFACE ACOUSTIC WAVE ACTUATOR, AND MAGNETIC DISK DEVICE AND OPTICAL DISK DEVICE USING THE SAME

FIELD OF THE INVENTION

The present invention relates to surface acoustic wave actuators, and magnetic disk devices and optical disk devices incorporating surface acoustic wave actuators.

BACKGROUND OF THE INVENTION

Surface acoustic wave actuators have potential for use as small linear actuators due to their advantages of high speed and high thrust driving capabilities with a small size.

Japanese Laid-open Patent No. H10-296186 and an invention introduced on p. 505 of the 10th "Electromagnetic Dynamics" symposium reports disclose means of improving the energy efficiency of conventional surface acoustic wave actuators. FIG. 9 shows a surface acoustic wave actuator disclosed in Japanese Laid-open Patent No. H10-296186. Waveguide 17 is configured in an orbital circuit, and surface acoustic waves are propagated along this orbital circuit, thus improving the energy efficiency for driving slider 18. FIG. 10 shows a surface acoustic wave actuator introduced on p. 505 of the 10th "Electromagnetic Dynamics" Symposium reports. In this surface acoustic wave actuator, four unidirectional interdigital transducers 19 having reflector 100 circulate energy, and two driving electrodes 20 work to replenish only the energy lost by circulation to improve the energy efficiency.

However, the means of improving the energy efficiency in the conventional surface acoustic wave actuators as described above requires a larger area on the vibrator for areas other than the propagating face. The system disclosed in Japanese Laid-open patent No. H10-296186 requires an area equivalent to the propagating face for circulating the surface acoustic waves, and the system disclosed on p. 505 of the 10th "Electromagnetic Dynamics" symposium reports, requires many interdigital transducers, enlarging the area occupied by these electrodes on the vibrator.

The present invention aims to offer a surface acoustic wave actuator with even better energy efficiency while maintaining a small area for that other than the propagating face on the vibrator.

SUMMARY OF THE INVENTION

The surface acoustic wave actuator of the present invention includes a vibrator, a first unidirectional interdigital transducer disposed on the vibrator, a second unidirectional interdigital transducer disposed on the vibrator, and an electrical combiner. One of the unidirectional interdigital transducers is connected to an input port of the electrical combiner, and the other unidirectional interdigital transducer is connected to an output port.

This configuration limits an area other than the propagating face on the vibrator to that occupied by two unidirectional interdigital transducers. Energy of the surface acoustic waves propagated on the propagating face is excited by one of the unidirectional interdigital transducers connected to the output port of the electrical combiner, and then converted to electrical energy by the unidirectional interdigital transducer connected to the input port. The electrical combiner adds this electrical energy and high frequency signal energy input from the external power supply, and then the combined energy is input again to the unidirectional interdigital transducer connected to the output port for exciting the surface acoustic waves. This configuration allows to circulate the energy, and thus energy of the surface acoustic waves is kept constant by just replenishing energy from the external power supply lost during circulation. Accordingly, a surface acoustic wave actuator with good energy efficiency is achievable. The present invention thus reduces the area other than the propagating face on the vibrator, achieving a surface acoustic wave actuator with even better energy efficiency.

Moreover, the surface acoustic wave actuator of the present invention includes the first and second unidirectional interdigital transducers; vibrator on which the unidirectional interdigital transducers are disposed in a way to have the first unidirectional interdigital transducer to electrically convert the surface acoustic wave excited by the second unidirectional interdigital transducer; relative movement member which moves relative to the vibrator; an electrical combiner to which the first unidirectional interdigital transducer and external power supply is connected to its input port and the second unidirectional interdigital transducer is connected to its output port; and means for generating contact pressure between the vibrator and relative movement member. This configuration makes it possible to achieve a surface acoustic wave actuator with a smaller area outside the propagating face and better energy efficiency than the prior art.

The surface acoustic wave actuator of the present invention also includes the first and second unidirectional interdigital transducers; vibrator on which the unidirectional interdigital transducers are disposed in a way to have one unidirectional interdigital transducer to electrically convert the surface acoustic wave excited by the other unidirectional interdigital transducer; a relative movement member which moves relative to the vibrator, a switch for changing the combination of connection of the first and second unidirectional interdigital transducers to the input and output ports of the electrical combiner; an electrical combiner to which the switch is connected and external power supply is also connected to its remaining input port; and means for generating contact pressure between the vibrator and relative movement member. Changing the combination of connections selected by the switch allows it to be driven in both directions, and enables the surface acoustic wave actuator with a smaller area outside the propagating face and further better energy efficiency than the prior art to be achieved.

The surface acoustic wave actuator of the present invention also connects the output and input ports of the electrical combiner by means of the switch when the relative movement member does not move in relative to the vibrator. The actuator may thus be driven, stopped, and its driving direction switched without any adjustment of the external power supply. This configuration allows a surface acoustic wave actuator occupying a smaller area outside the propagating face and better energy efficiency than the prior art to be achieved.

The surface acoustic wave actuator of the present invention is also provided with the electrical combiner which combines energy in a way such that energy input from the unidirectional interdigital transducer is four times or greater than the energy input from the external power supply. A higher combining ratio allows the energy efficiency to be further improved.

The surface acoustic wave actuator of the present invention also has equivalent input admittance at the driving frequency of both first and second unidirectional interdigital transducers. This facilitates the manufacture of the electrical combiner or switch, reducing any loss which may occur by matching.

The surface acoustic wave actuator of the present invention also has a unidirectional interdigital transducer whose input admittance at the driving frequency satisfies a matching condition with characteristic impedance. Easier matching with the electrical combiner or switch reduces matching loss, and thus further improves energy efficiency.

The surface acoustic wave actuator of the present invention also propagates the surface acoustic waves to at least one waveguide provided on the vibrator. This reduces the loss by diffraction of the surface acoustic waves, enabling further improvement of energy efficiency.

The surface acoustic wave actuator of the present invention also has a vibrator whose face propagating the surface acoustic waves is partially made of a different material. Selection of the most suitable material allows good friction driving characteristics and cost reduction to be achieved.

The use of the above surface acoustic wave actuators as an actuator for driving a head in a magnetic disk device allows the magnetic disk device with good access performance to be achieved.

The use of the above surface acoustic wave actuators as an actuator for driving a head in an optical disk device allows the optical disk device with good access performance to be achieved.

DESCRIPTION OF THE PREFERRED EMBODIMENT

Exemplary embodiments of the present invention are described with reference to FIGS. 1 to 8.

First Exemplary Embodiment

Figure 1:
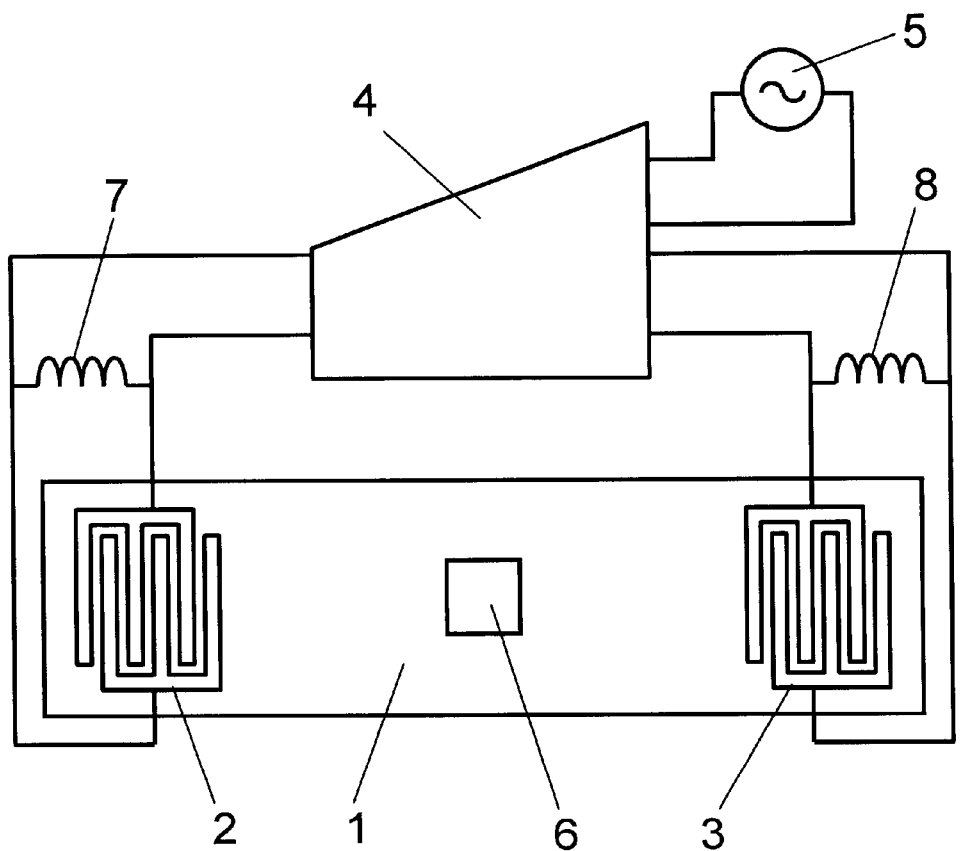
FIG. 1 is a schematic view of a surface acoustic wave actuator in accordance with a first exemplary embodiment of the present invention.

FIG. 1 is a schematic view illustrating a surface acoustic wave actuator in the first exemplary embodiment of the present invention. In FIG. 1, unidirectional interdigital transducers 2 and 3 are provided on both sides of vibrator 1. The unidirectional interdigital transducer is configured with the combination of an interdigital transducer and a reflector (not shown in the figure).

Inductors 7 and 8 are attached to the unidirectional interdigital transducers 2 and 3 respectively for canceling the capacitance component of the unidirectional interdigital transducers at the frequency of high frequency signals output from external power supply 5, i.e., the driving frequency of the surface acoustic wave actuator. The vibrator 1 is preferably made of piezoelectric material. For example, lithium niobate, which is piezoelectric crystal, is preferable due to its high electromechanical coupling factor.

The unidirectional interdigital transducer 2 is connected to an output port of electrical combiner 4, and the unidirectional interdigital transducer 3 is connected to an input port of the electrical combiner 4. External power supply 5 is also connected to the input port of the electrical combiner 4, and the input energy from the external power supply 5 and the surface acoustic wave energy electrically converted by the unidirectional interdigital transducer 3 are combined. This combined energy is input to the unidirectional interdigital transducer 2.

The surface acoustic waves excited by the unidirectional interdigital transducer 2 propagate toward the unidirectional interdigital transducer 3 on the vibrator 1, and are then input again to the unidirectional interdigital transducer 2, passing through the electrical combiner 4. The electrical combiner 4 outputs high frequency signals from combined energy of the two signals by inputting two high frequency signals in the same phase. This electrical combiner is also operable as a splitter by switching the input and output. For example, a hybrid electrical combiner using ferrite core may be used, and this is preferable with respect to small loss. Energy lost during this operation is equivalent to the loss sustained during circulation of energy. Accordingly, the surface acoustic waves are excited with a good energy efficiency by matching (i) the characteristic impedance of the output port of the electrical combiner 4 and input impedance of the unidirectional interdigital transducer 2, and (ii) the characteristic impedance of the input port of the electrical combiner 4 and input impedance of the unidirectional interdigital transducer 3.

The input and output characteristic impedance of the electrical combiner is preferably set at 50 Ω or 75 Ω for allowing to use standardized coaxial cables for wiring. In a design of the unidirectional interdigital transducer, the inductors 7 and 8 for matching can be omitted by designing aperture size and strip electrode pairs of the interdigital transducer and a distance between the interdigital transducer and reflector in a way that input admittance of the unidirectional interdigital transducer is matched with characteristic impedance of the electrical combiner at the driving frequency. This enables to reduce the loss.

The combining ratio in the electrical combiner 4 affects the efficiency of the surface acoustic wave actuator. The electrical combiner 4 is designed to combine two inputs at a constant combining ratio. If a ratio of the two inputs differs from the designed ratio, isolation resistance consumes unbalanced energy. For example, if the combining ratio of 1:1 is designed for a general electrical combiner, energy efficiency is 4 times more at the maximum compared to that of a surface acoustic wave actuator without improving the energy efficiency. This is because the surface acoustic waves can be excited using twice the energy at the maximum output from the external power supply 5 by combining energy, and also the unidirectional interdigital transducer used for exciting the surface acoustic waves allows to propagate twice the energy of that using non-unidirectional interdigital transducer on the propagating face. In the same way, for example, if the combining ratio of energy input from the unidirectional interdigital transducer 3 and energy input from the external power supply 5 are designed to be 2:1 in the electrical combiner 4, the energy efficiency increases to 6 times that of the prior art at the maximum. In case of the ratio 4:1, for example, efficiency is ten times at the maximum, and the ratio 49:1, for example, 100 times at the maximum. Accordingly, the maximum energy efficiency may be set to 10 times or more compared to the prior art by setting the combining ratio to 4:1 or greater for example. The surface acoustic waves are thus excited with even better energy efficiency. It is preferable to design energy input from the external power supply 5 to be equivalent to the energy lost during a single circulation for eliminating the loss by isolation resistance.

Figure 2:
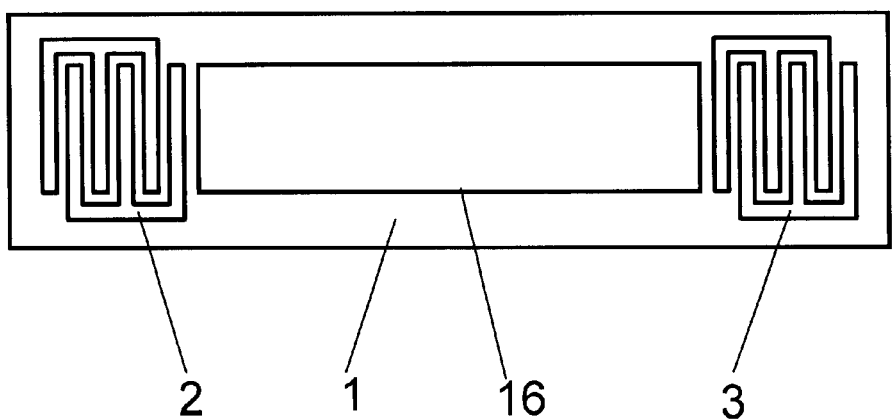
FIG. 2 is a plan view of a propagating face of a vibrator in accordance with the first exemplary embodiment of the present invention.

In addition, as shown in FIG. 2, metal film 16, Cr, Al or the like, for example, is applied on the propagating face of the vibrator 1 as an electrical short-circuiting face for functioning as waveguide to reduce loss by diffraction of the surface acoustic wave. Accordingly, the surface acoustic wave may be excited with greater energy efficiency.

Relative movement member 6 is provided on the vibrator. The relative movement member 6 is pressed against the vibrator 1 by means of for example, a spring (not illustrated) used as a pressure applying means. When the surface acoustic waves are generated on the vibrator 1, a driving force occurs as a result of the friction force on an ellipse locus on the surface, and thus the relative movement member 6 implements relative movement to the vibrator 1.

Accordingly, the first exemplary embodiment only has two unidirectional interdigital transducers on the vibrator other than the propagating face, achieving a surface acoustic wave actuator with good energy efficiency.

The above description refers to a structure in which the unidirectional interdigital transducer is configured with the combination of an interdigital transducer and reflector. The unidirectional interdigital transducer may also be configured only with the interdigital transducer. Also for the waveguide, the above description refers to a thin film waveguide which slows down the speed in the waveguide relative to the surrounding speed. A slot waveguide for achieving a faster speed in the waveguide than the surrounding speed, or a topographic waveguide made by deforming the shape are also applicable to the first exemplary embodiment.

Second Exemplary Embodiment

Figure 3:
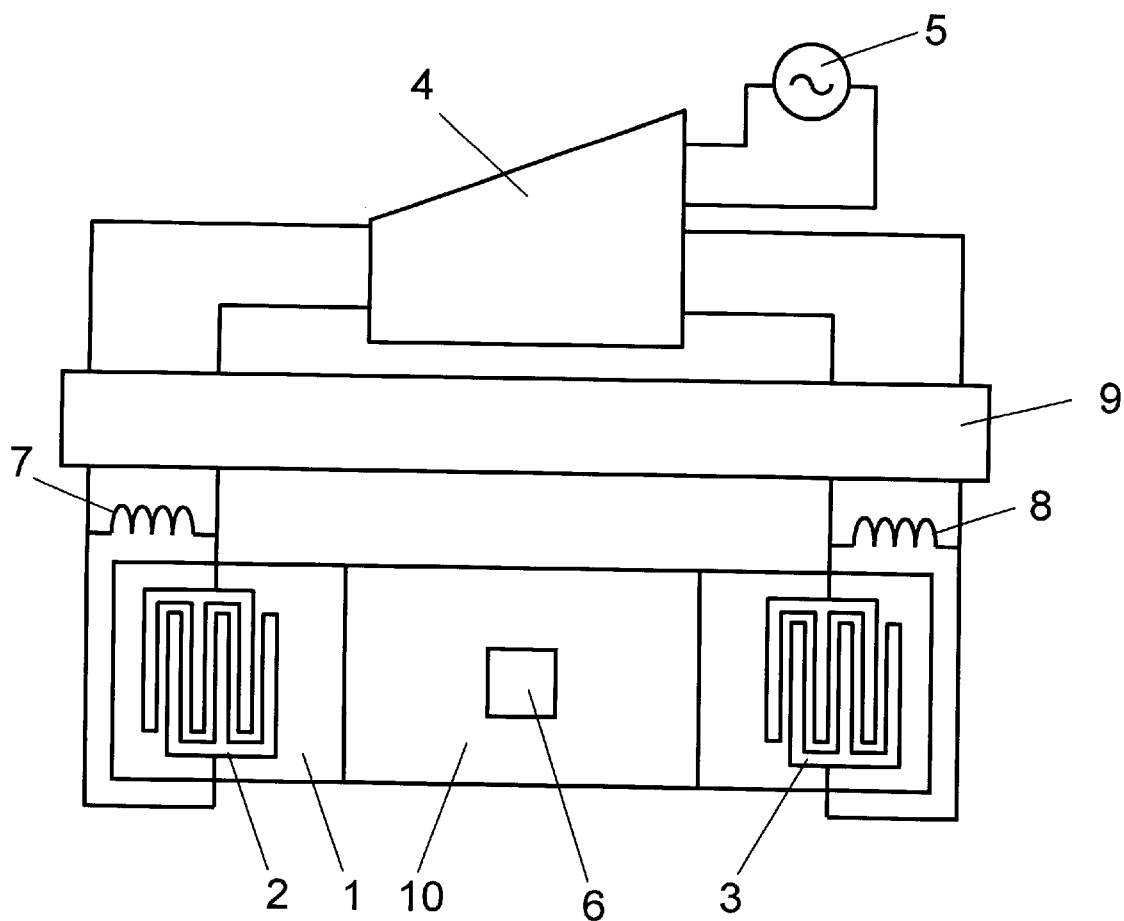
FIG. 3 is a schematic view of a surface acoustic wave actuator in accordance with a second exemplary embodiment of the present invention.
Figure 4:
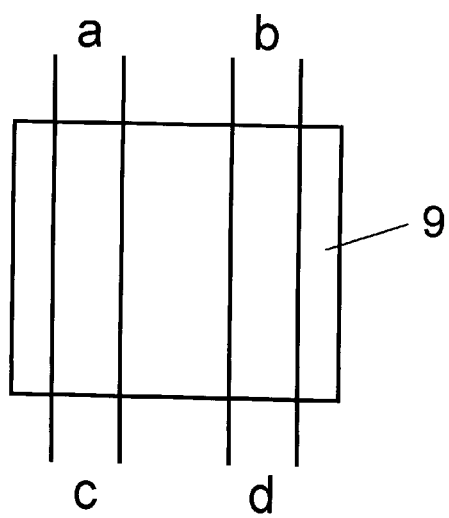
FIG. 4 is a schematic view illustrating the combination of connection using a switch at driving the surface acoustic wave actuator in accordance with the second exemplary embodiment of the present invention.
Figure 5:
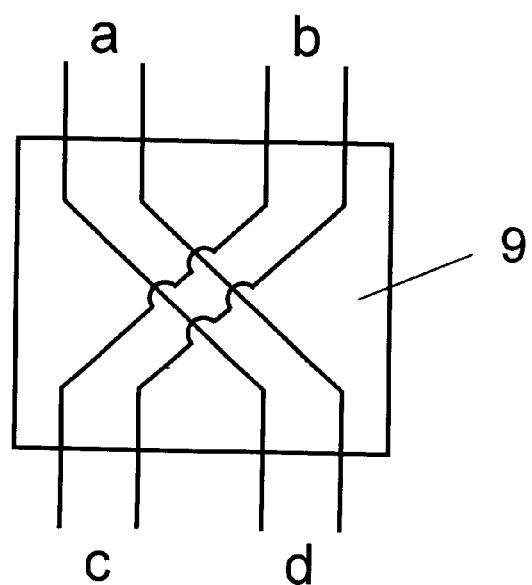
FIG. 5 is a schematic view illustrating the combination of connection using a switch at reversely driving the surface acoustic wave actuator in accordance with the second exemplary embodiment of the present invention.
Figure 6:
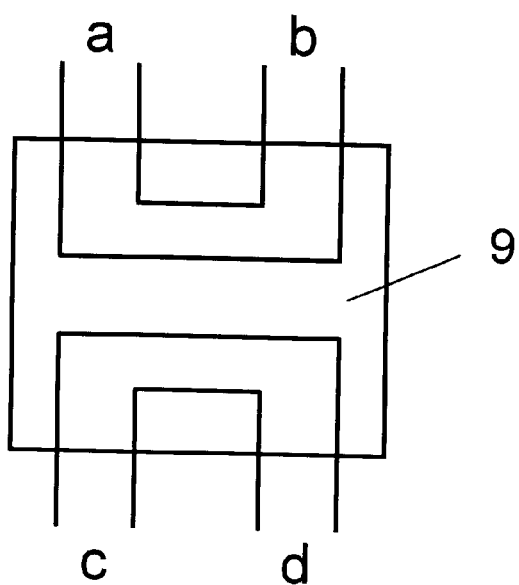
FIG. 6 is a schematic view illustrating the combination of connection using a switch at stopping the surface acoustic wave actuator in accordance with the second exemplary embodiment of the present invention.

FIG. 3 is a schematic view illustrating a surface acoustic wave actuator in the second exemplary embodiment of the present invention. Identical reference numerals are given to those having the same functions as the first exemplary embodiment for omitting redundant description. In the second exemplary embodiment, switch 9 is provided between the unidirectional interdigital transducers 2 and 3, and the electrical combiner 4. The switch 9 changes connection in three ways as shown in FIGS. 4, 5, and 6. Ports a, b, c, and d of the switch 9 are respectively connected to the output port and input port of the electrical combiner 4, unidirectional interdigital transducer 2, and unidirectional interdigital transducer 3.

A connection shown in FIG. 4 is the same combination as that in the first exemplary embodiment.

When a connection shown in FIG. 5 is established, the unidirectional interdigital transducer 3 excites the surface acoustic waves, and the unidirectional interdigital transducer 2 converts them to electric energy. In other words, the surface acoustic waves propagate to the direction opposite to that in the first exemplary embodiment. Accordingly, driving in both directions is achievable by switching between the combinations shown in FIGS. 4 and 5. An area other than the propagating face is thus reduced compared to the prior art, allowing the surface acoustic wave actuator with even better energy efficiency to be achieved.

Portion 10 of the propagating face of the vibrator 1, which is made of a material different from other portions, preferably glass or single-crystal such as $Al_2O_3$ or Si, is effective for reducing cost. In addition, friction driving characteristics can be improved by using a thin film material which improves sliding characteristics, preferably well-known diamond-like carbon, on the propagating face.

The switch 9 is configurable with uniform characteristic impedance by making the input admittance at the driving frequency of the unidirectional interdigital transducer 2 and unidirectional interdigital transducer 3 equivalent. This facilitates the manufacture of the surface acoustic wave actuator. More preferably, the unidirectional interdigital transducer 2 and unidirectional interdigital transducer 3 are made into the same shape so that the input admittance at the driving frequency inevitably become equivalent.

The combination shown in FIG. 6 enables to stop driving of the actuator without changing the operation of driving power supply. Accordingly, driving and stopping, and driving direction of the actuator are changeable by switching the combination of connection with the switch 9.

Third Exemplary Embodiment

Figure 7:
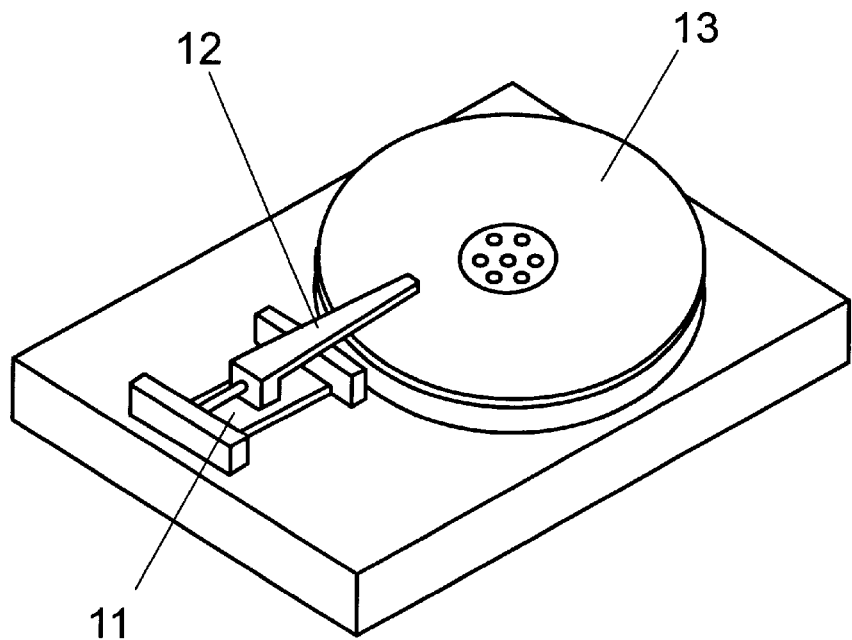
FIG. 7 is a schematic view of a surface acoustic wave actuator in accordance with a third exemplary embodiment of the present invention.

FIG. 7 is a schematic view of a magnetic disk device employing a surface acoustic wave actuator in the third exemplary embodiment of the present invention. As shown in FIG. 7, head arm 12 is attached to the surface acoustic wave actuator 11 described in the second exemplary embodiment for positioning against magnetic disk 13. The use of the surface acoustic wave actuator of the present invention as an actuator for driving the head of the magnetic disk enables the positioning of the head accurately, allowing the magnetic disk device with good access performance to be achieved.

Fourth Exemplary Embodiment

Figure 8:
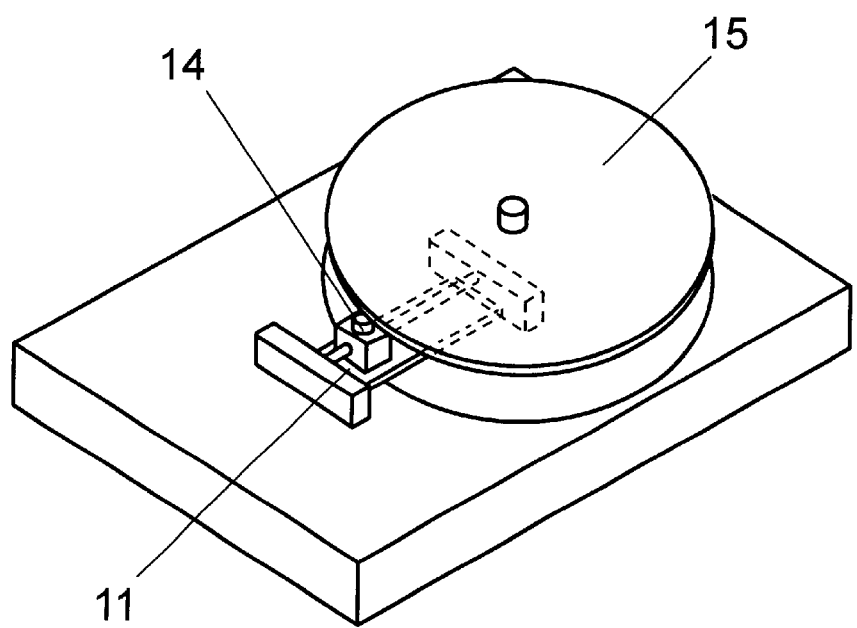
FIG. 8 is a schematic view of a surface acoustic wave actuator in accordance with a fourth exemplary embodiment of the present invention.
Figure 9:
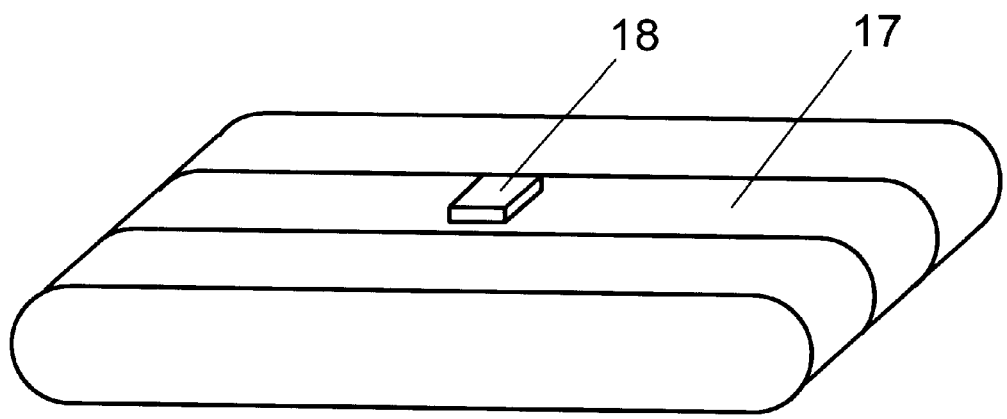
FIG. 9 is a perspective view of a conventional surface acoustic wave actuator.
Figure 10:
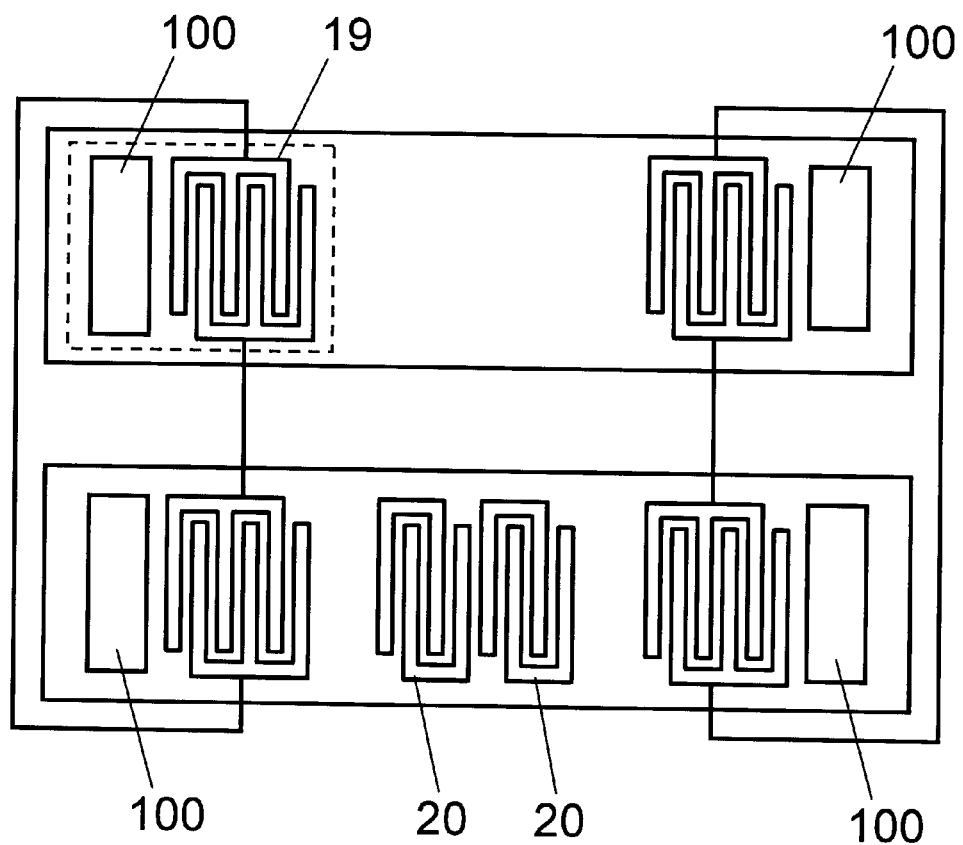
FIG. 10 is a plan view of a conventional surface acoustic wave actuator.

FIG. 8 is a schematic view illustrating an optical disk device employing a surface acoustic wave actuator in the fourth exemplary embodiment of the present invention. As shown in FIG. 8, optical head 14 is attached to the surface acoustic wave actuator 11 described in the second exemplary embodiment for positioning against optical disk 15. The use of the surface acoustic wave actuator of the present invention as an actuator for driving the head of the optical disk enables the positioning of the head accurately, allowing the optical disk device with good access performance to be achieved.

It is apparent that the present invention is not limited to the above exemplary embodiments. A wide range of modifications based on the intention of the present invention are available, and thus those are included in the present invention.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A surface acoustic wave actuator comprising:
   a vibrator;
   a first unidirectional interdigital transducer disposed on said vibrator;
   a second unidirectional interdigital transducer disposed on said vibrator; and
   an electrical combiner having an input port coupled to an external power supply and one of said unidirectional interdigital transducers, and an output port connected to the other of said unidirectional interdigital transducers.

2. The surface acoustic wave actuator as defined in claim 1 further comprising a switch for changing a combination of connections of said first and second unidirectioanl interdigital transducers to said input and output ports of said electrical combiner.

3. The surface acoustic wave actuator as defined in claim 1 further comprising;
   a relative movement member for relative movement to said vibrator; and
   means for generating contact pressure between said vibrator and said relative movement member.

4. The surface acoustic wave actuator as defined in claim 2 further comprising:
   a relative movement member for relative movement to said vibrator; and
   means for generating contact pressure between said vibrator and said relative movement member.

5. A surface acoustic wave actuator comprising:
   a vibrator;
   a first unidirectional interdigital transducer disposed on said vibrator for exciting a surface acoustic wave;
   a second unidirectional interdigital transducer disposed on said vibrator for electrically converting the surface acoustic wave;
   an electrical combiner having an input port coupled to an external power supply and said second unidirectional interdigital transducer, and an output port connected to said first unidirectional interdigital transducers;
   a relative movement member for relative movement to said vibrator; and
   means for generating contact pressure between said vibrator and said relative movement member.

6. A surface acoustic wave actuator comprising:
   first and second unidirectional interdigital transducers;
   a vibrator on which said unidirectional interdigital transducers are disposed in a way to have one of said unidirectional interdigital transducers electrically convert surface acoustic waves excited by the other of said unidirectional interdigital transducers;
   a relative movement member for providing relative movement to said vibratory;
   a switch for changing a combination of connections of said first and second unidirectional interdigital transducers to the input and output ports of said electrical combiner;
   an electrical combiner to which said switch is connected, and an external power supply also to be connected to its remaining input port; and means for generating contact pressure between said vibrator and said relative movement member.

7. The surface acoustic wave actuator as defined in claim 6, wherein said switch connects the output and input ports of said electrical combiner in the absence of relative movement between said relative movement member and said vibrator.

8. The surface acoustic wave actuator as defined in claim 6, wherein said electrical combiner combines energy in a way that energy input from the other unidirectional interdigital transducer connected to the input port of said electrical combiner is at least four times an energy of that input from the external power supply connected to said input port.

9. The surface acoustic wave actuator as defined in claim 5, wherein input admittances of said first unidirectional interdigital transducer and said second unidirectional interdigital transducer are equivalent at a driving frequency.

10. The surface acoustic wave actuator as defined in claim 5, wherein an input admittance of said unidirectional interdigital transducer at a driving frequency satisfies a matching condition with a characteristic impedance of said electrical combiner.

11. The surface acoustic wave actuator as defined in claim 5, wherein said vibrator has at least one waveguide, and the surface acoustic wave propagates on said waveguide.

12. The surface acoustic wave actuator as defined in claim 5, wherein a portion of a face propagating the surface acoustic wave on said vibrator is made of a material different from that of other portions of said vibrator.

13. The surface acoustic wave actuator as defined in claim 5, wherein a metal film is provided partially on a face propagating the surface acoustic wave on said vibrator as an electrical short-circuiting face.

14. The surface acoustic wave actuator as defined in claim 6, wherein said electrical combiner combines energy in a way that energy input from said unidirectional interdigital transducer is at least four times an energy of that input from the external power supply.

15. The surface acoustic wave actuator as defined in claim 6, wherein input admittances at a driving frequency of said first unidirectional interdigital transducer and said second unidirectional interdigital transducer are equivalent.

16. The surface acoustic wave actuator as defined in claim 6, wherein an input admittance of said unidirectional interdigital transducer at a driving frequency satisfies a matching condition with characteristic impedance of said electrical combiner.

17. The surface acoustic wave actuator as defined in claim 6, wherein the surface acoustic wave propagates on at least one waveguide disposed on said vibrator.

18. The surface acoustic wave actuator as defined in claim 6, wherein a portion of a face propagating the surface acoustic wave on said vibrator is made of a material different from that of other portions of said vibrator.

19. The surface acoustic wave actuator as defined in claim 6, wherein a metal film is provided partially on a face propagating the surface acoustic wave on said vibrator as an electrical short-circuiting face.

20. A magnetic disk device employing the surface acoustic wave actuator as defined in claim 5 as an actuator for driving a head.

21. An optical disk device employing the surface acoustic wave actuator as defined in claim 5 as an actuator for driving a head.

22. A magnetic disk device employing the surface acoustic wave actuator as defined in claim 6 as an actuator for driving a head.

23. An optical disk device employing the surface acoustic wave actuator as defined in claim 6 as an actuator for driving a head.

* * * * *